(12) United States Patent
Fadel (10) Patent No.: US 6,597,736 B1
(45) Date of Patent: Jul. 22, 2003

(54) THROUGHPUT ENHANCED VIDEO COMMUNICATION

(75) Inventor: Charles K. Fadel, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/537,926

(22) Filed: Mar. 29, 2000

(51) Int. Cl.[7] .................................................. H04B 1/66

(52) U.S. Cl. ................................................ 375/240.01

(58) Field of Search .......................... 375/240, 240.01, 375/240.15, 240.16, 240.22; 382/107, 110, 117, 118, 119, 234, 236; H04B 1/66

(56) References Cited

U.S. PATENT DOCUMENTS

| | | | | |
|---|---|---|---|---|
| 5,128,757 A | * | 7/1992 | Citta et al. | 358/133 |
| 5,262,856 A | * | 11/1993 | Lippman et al. | 358/136 |
| 5,280,530 A | | 1/1994 | Trew et al. | 382/1 |
| 5,543,939 A | | 8/1996 | Harvey et al. | 358/426 |
| 5,625,715 A | * | 4/1997 | Trew et al. | 382/236 |
| 5,719,951 A | * | 2/1998 | Shackleton et al. | 382/118 |
| 5,867,588 A | | 2/1999 | Marquardt | 382/118 |
| 5,901,249 A | * | 5/1999 | Ito | 382/239 |
| 5,920,477 A | * | 7/1999 | Hoffberg et al. | 364/148 |
| 5,930,379 A | * | 7/1999 | Rehg et al. | 382/107 |
| 6,016,148 A | * | 1/2000 | Kang et al. | 345/425 |
| 6,208,693 B1 | * | 3/2001 | Chen et al. | 375/240.24 |
| 6,253,210 B1 | * | 6/2001 | Smith et al. | 707/104 |
| 6,256,423 B1 | * | 7/2001 | Krishnamurthy et al. | 382/251 |
| 6,292,575 B1 | * | 9/2001 | Bortolussi et al. | 382/118 |
| 6,404,900 B1 | * | 6/2002 | Qian et al. | 382/103 |

FOREIGN PATENT DOCUMENTS

| | | |
|---|---|---|
| EP | 0 516 701 B1 | 2/1997 |
| JP | 10084538 A | 3/1998 |

OTHER PUBLICATIONS

"Video Conferencing for business," http://developer.intel.com/proshare/conferencing/index.htm, downloaded Oct. 12, 1999.
"Developers—What Intel® Streaming Web Video Software Can Do for You", http://developer.intel.com/ial/swv/developer.htm, downloaded Oct. 12, 1999.
"Streaming Media Buyers Guide," http://www.realnetworks.com/products/servers/bguide/index.html, downloaded Mar. 9, 2000.
Lopez, R., et al., "Head and Feature Tracking for Model-based Video Coding," *International Workshop on Synthetic–Natural Hybrid Coding and 3–D Imaging*, Greece, 1997.
Videotelephony Services—General; Recommendation F.720, The International Telegraph and Telephone Consultative Committee (CCITT), 1993.
"Videophone service in the Public Switched Telephone Network (PSTN) ITU–T Recommendation," Telecommunication Standardization Sector of ITU, 1996.
"Bringing life to the network" http://ww.ezenia.com/html/pic/corporate.pdf.

* cited by examiner

*Primary Examiner*—Chris Kelley
*Assistant Examiner*—Tung Vo
(74) *Attorney, Agent, or Firm*—Hamilton, Brook, Smith & Reynolds, P.C.

(57) ABSTRACT

Video image communication throughput is enhanced by mapping the video image based on a predetermined color range, creating a color mapped image. A first template is created around certain regions of the color mapped image. A second template is created around certain shapes within the first template. Bandwidth on the communications link is then allocated based on the regions of the video image relative to the boundaries of the templates. The techniques are primarily used to optimize video images of the human face. The first template approximates the shape of a human face. The second template approximates a rectangular shape of the eyes region of a human face and a triangular shape of the nose-mouth region of a human face. Bandwidth is the allocated based upon the defined regions.

39 Claims, 3 Drawing Sheets

THROUGHPUT ENHANCED VIDEO COMMUNICATION

BACKGROUND OF THE INVENTION

This invention relates generally to communications within a computer network and more particularly to video image communications and display.

Video imaging refers to the rendering of text and graphics images on a display. Each video image is a sequence of frames, typically thirty frames are displayed on a screen every second. Images are transmitted over various high bit rate communications media, such as coaxial cable and Asymmetric Digital Subscriber Line ("ADSL"), as well as over lower bit rate communications media, such as Plain Old Telephone Service ("POTS"), wireless phone service and power line communication networks. Video images may be displayed in black and white, gray scale or color. A 24-bit color video image at 640×480 pixel resolution would occupy almost one megabyte per frame, or over a gigabyte per minute to display, therefore lower bit rate communication media is unable to provide real time display of video images without some improvement.

One improvement in the throughput of video communications has been the use of video compression to reduce the size of files and packets containing video images represented in digital form, thereby increasing the resolution of displayed video images. Video compression can be applied both intraframe (using only information contained in a single frame) or interframe (using information in other frames of the video image). Because humans cannot perceive very small changes in color or movement, compression techniques need not preserve every bit of information. These lossy compression techniques can be used to achieve large reductions in video image size without affecting the perceived quality of the image. Compression techniques alone have not produced the transmission quality required for video applications (e.g., video telephony) on lower bit rate networks.

MPEG (Moving Picture Experts Group) is an ISO/IEC working group developing international standards for compression, decompression, and representation of moving pictures and audio. MPEG-4 is a part of the standard currently under development designed for videophones and multimedia applications. MPEG-4 provides for video services on a lower bandwidth of up to 64 kilobits per second. MPEG-4 uses media objects to represent audiovisual content. Media objects can be combined to form compound media objects. MPEG-4 multiplexes and synchronizes the media objects before transmission to provide higher quality of service. MPEG-4 organizes the media objects in a hierarchical fashion where the lowest level has primitive media objects like still images, video objects, audio objects. MPEG-4 has a number of primitive media objects which can be used to represent two or three-dimensional media objects. MPEG-4 also defines a coded representation of objects for text, graphics, synthetic sound, and talking synthetic heads. The visual part of the MPEG-4 standard describes methods for compression of images and video, it also provides algorithms for random access to all types of visual objects as well as algorithms for spatial, temporal and quality scalability, content-based scalability of textures, images and video. Additionally, algorithms for error robustness and resilience in error prone environments are also part of the standard. For synthetic objects MPEG-4 has parametric descriptions of human face and body, parametric descriptions for animation streams of the face and body. MPEG-4 also describes static and dynamic mesh coding with texture mapping, texture coding with view dependent applications.

MPEG-4 supports coding of video objects with spatial and temporal scalability. Scalability allows decoding a part of a stream and constructing images with reduced decoder complexity (reduced quality), reduced spatial resolution, reduced temporal resolution., or with equal temporal and spatial resolution but reduced quality. Scalability is desired when video is sent over heterogeneous networks, or receiver can not display at full resolution (limited power). Robustness in error prone environments is an important issue for mobile communications. MPEG-4 has tools to address robustness, including resynchronization of the bit stream and the decoder when an error has been detected. Data recovery tools can also be used to recover lost data. Error concealment tools are used to conceal the lost data. MPEG-4 is a general purpose scheme designed to maximize video content over communication lines.

Streaming is a technique used for sending audiovisual content in a continuous stream and having it displayed as it arrives. The content is compressed and segmented into a sequence of packets. A user does not have to wait to download a large file before seeing the video or hearing the sound because content is displayed as it arrives, and additional content is downloaded as already downloaded content is displayed. Streaming can be applied to MPEG-4 media objects to enhance a user's audiovisual experience.

H.261 is a standard that was developed for transmission of video at a rate of multiples of 64 Kbps. Videophone and videoconferencing are some applications. H.261 standard is similar to JPEG still image compression standard and uses motion-compensated temporal prediction.

H.263 is a standard that was designed for very low bit rate coding applications. H.263 uses block motion-compensated Discrete Cosine Transform ("DCT") structures for encoding. H.263 encoding has higher efficiency than H.261 encoding. H.263 is based on H.261 but it is significantly optimized for coding at low bit rates. Video coding is performed by partitioning each picture into macroblocks. Each macroblock consists of 16×16 luminance block and 8×8 chrominance blocks of Cb and Cr. Cb and Cr are the color difference signals in ITU-R 601 coding. The two color difference signals are sampled at 6.75 MHZ co-sited with a luminance sample. Cr is the digitized version of the analogue component (R-Y), likewise Cb is the digitized version of (B-Y). Each macroblock can be coded as intra or as inter. Spatial redundancy is exploited by DCT coding, temporal redundancy is exploited by motion compensation. H.263 includes motion compensation with half-pixel accuracy and bidirectionally coded macroblocks. 8×8 overlapped block motion compensation, unrestricted motion vector range at picture boundary, and arithmetic coding are also used in H.263. These features are not included in MPEG-1 and MPEG-2 since they are useful for low bit rate applications. H.263 decoding is based on H.261 with enhancements to support coding efficiency. Four negotiable options are supported to improve performance. These are unrestricted motion vector mode, syntax-based arithmetic coding mode, advanced prediction mode and PB-frames mode. Unrestricted motion vector mode allows motion vectors to point outside a picture. Syntax-based arithmetic coding mode allows using arithmetic coding instead of Huffman coding. Advanced prediction mode uses overlapped block motion compensation with four 8×8 block vectors instead of a single 16×16 macroblock motion vector. PH-frames mode allows a P-frame and a B-frame to be coded together as a single PB-frame.

Model based video-coding schemes define three-dimensional structural models of a scene, the same model is used by a coder to analyze an image, and by a decoder to generate the image. Traditionally research in model-based video coding ("MBVC") has focused on head modeling, head tracking, local motion tracking, and expression analysis, synthesis. MBVC has been mainly used for videoconferencing and videotelephony, since in those applications the focus is on the modeling of the human head. MBVC has concentrated its modeling on images of heads and shoulders, because they are commonly occurring shapes certain video applications (e.g., videotelephony). In model-based approaches a parameterized model is used for each object (e.g., a head) in the scene. Coding and transmission is done using the parameters associated with the objects. Tools from image analysis and computer vision are used to analyze the images and find specific parameters (e.g., size, location, and motion of the objects in the scene).

Motion vectors are used in a technique used to segment video images, based upon an analysis of the global motion of a video sequence. With this technique, only pixels that represent a portion of the image that changed since the last refresh need to be transmitted along a communications link. Motion vectors can reduce the amount of data needed to transmit an image, thus increasing the effectiveness of low bit rate communication links.

Video conferencing is teleconferencing in which video images are transmitted among the various geographically separated participants at a meeting. Originally done using analog video and satellite links, today video conferencing uses compressed video images transmitted over wide area networks or the Internet. Typically, a 56 Kbps communications channel can support freeze-frame video, whereas a 1.544-Mbps (Ti) channel supports full-motion video.

Providing full-motion video experience, with television-like definition, for at least the most significant regions of a displayed image, at low bit rate communication speeds, has proven to be a very difficult problem.

SUMMARY OF THE INVENTION

Compression is one approach to solving the bandwidth problem of displaying video images on low bit rate communication channels. Compression is typically implemented at the physical/link layer in the network protocols model. A problem with using compression at the physical/link level is that it cannot be sensitive to which regions of the displayed image are deemed important to the viewer.

Using asymmetrical communications technologies, such as ADSL or cable, doesn'T address the problem of video image communications when used for conferencing (e.g., video teleconferencing), because conferencing is a symmetrical application. Asymmetrical technologies optimize only one direction of the communications channel. They are very useful in specific types of communications applications (e.g., Web browsing, where a vast majority of the communications activity involves downloading data from the Internet, but very little uploading to the Internet). Video teleconferencing and videotelephony are symmetrical applications, requiring approximately equal bandwidth in both directions, while ADSL or cable are asymmetrical technologies that typically provide 10:1 download to upload ratios.

Motion vectors can improve effective bandwidth in a video communications system, but can not differentiate significant image changes (e.g., a facial expression changing) from insignificant ones (e.g., a cloud passing in the background).

The present invention address the content issues at the application layer by identifying which regions of the video image are most significant to the viewer, while supporting the symmetric nature of video conferencing and videotelephony.

Thus, there is needed an effective technique for enhancing the throughput of low bit rate video image communications. Accordingly, the present invention provides a method, apparatus and article of manufacture for providing throughput enhanced video communication when receiving a video image over a communications link. The video image is mapped based on a predetermined color range, resulting in a color mapped image. The color range may consist of a black and white, gray-scale or color spectrum. A first template is created around certain regions of the color mapped image. A second template is created around certain shapes within the first template. Bandwidth on the communications link is adjusted based on the regions of the video image that are: 1) outside the boundaries of the first template, 2) inside the boundaries of the first template, and 3) inside the boundaries of the second template. Finally, the throughput enhanced video image is displayed on a display screen.

One common image in video communication is that of the human face. The present invention uses various techniques to optimize video communications containing the human face. Accordingly, the color range used for mapping the video image is settable, and may include a range of flesh-tone colors. The first template approximates the shape of a human face. The second template approximates a rectangular shape of the eyes region of a human face and a triangular shape of the nose-mouth region of a human face. Based upon the use of mapping and templates; the highest amount of bandwidth is allocated to the image within the boundaries of the second template, a next highest amount of bandwidth is allocated to the image within the boundaries of the first template, and remaining bandwidth is allocated to the image outside the boundaries of the first template. The templates can be used in conjunction with a tracking system to compensate for movement of the face within a video image. Additionally, a user can manually adjust the boundaries of the templates to override their initial parameters.

The progression of mapping and template creation, when used in conjunction with the setting of communications bandwidth parameters, provides a novel solution to the problem of enhancing the throughput of low bit rate video image communications. These improvements increase a user's ability to read visual messaging and facial queues from embedded facial expressions because of the higher resolution allocated to specific areas of the video image. Specifically, the present invention addresses the problems caused by poor definition of facial expressions in video image communications. As social animals, human beings rely inordinately on visual messaging embedded in facial expressions, as those messages portray emotions and are powerful cues to the nonverbal aspects of face-to-face communications. Providing throughput enhanced video communications improves the definition of facial expression and provides for better human understanding in video image communications. This helps avoid problems that can arise when a user exerts so much effort trying to perceive poor quality facial expressions that they can actually miss some of the audio message as well. Efficient allocation of bandwidth in bandwidth-constrained environments (e.g., analog and wireless) is very important to providing high quality video images in videoconferencing and videotelephony systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. In one preferred embodiment of the present invention a videotelephony system is disclosed that allows for increased definition of facial expressions through the use of a series of mappings and templates created over the video image. One of the drawbacks of today's videotelephony systems is the inability of users to focus on the facial expression of a subject, because of poor facial cues. The distraction associated with the inability to focus on facial expressions can actually cause viewers to miss portions of the audio communications accompanying the video. Poorly defined facial expressions thus reduce a viewer's perception of not only video images, but audio communications as well.

Figure 1:
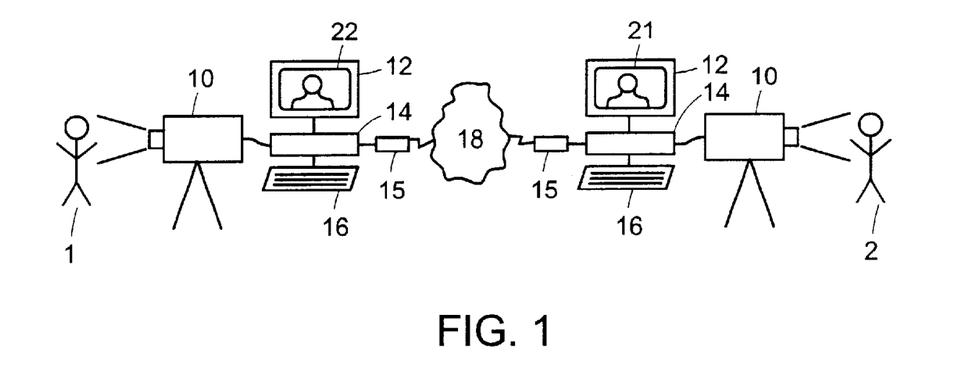
FIG. 1 is an illustration of a computer system upon which an embodiment of the present invention can be implemented.

FIG. 1 is an illustration of a computer system upon which an embodiment of the invention can be implemented. Two users, user 1 and user 2, are communicating with each other using audio and video images sent over communications network 18. Each user's image and voice is captured using a camera 10 connected to a computer 14. Computer 14 can be connected to output devices, such as display 12 and input devices, such as keyboard 16. Computer 14 is also connected, via modem 15, to communications network 18 for transmission of audio signals and video images to other computers 14. Modem 15 can be, among others, an analog, DSL, cable, wireless or power line device. Traditional analog and DSL communication devices communicate over copper wire. Cable communication utilize coaxial cable. Wireless communication devices use air waves at various spectrums. Power line communication devices utilize AC power lines for transferring data. An image of user 1 is displayed on user 2's display 12 as video image 21. Likewise, user 2's image is displayed on user 1's display 12 as video image 22. Computer 14 may be a personal computer (PC), workstation, embedded system component, handheld computer, telecommunications device or any device containing a memory and processor. In a preferred embodiment of the present invention computer 14 is an IBM-compatible PC containing an Intel Pentium® processor and random access memory.

Figure 2:
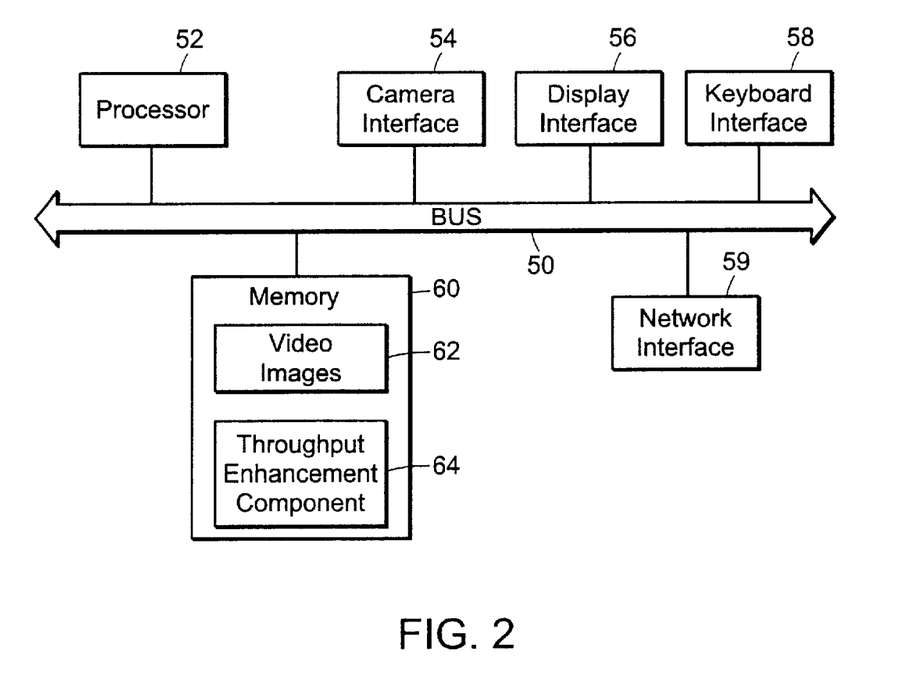
FIG. 2 shows the internal structure of the computer of FIG. 1.

FIG. 2 shows the internal structure of the computer of FIG. 1. Bus 50 connects processor 52, camera interface 54, display interface 56, keyboard interface 58, network interface 59 and memory 60. Camera interface 54 connects camera 10 to computer 14 for processing of audio and video images. Display interface 56 connects display 12 to computer 14 for displaying video images. Keyboard interface 58 connects keyboard 16 to computer 14 for inputting of data. Network interface 59 connects computer 14 to communications network 18 for the transmission of audio signals and video images to and from computers connected to communications network 18.

Memory 60 contains video images 62 and throughput enhancement component 64. Video images 62 are stored in memory 60 after having been received through communications network 18. Throughput enhancement component 64 processes the video images 62 using mapping and template techniques discussed in more detail below.

Figure 3:
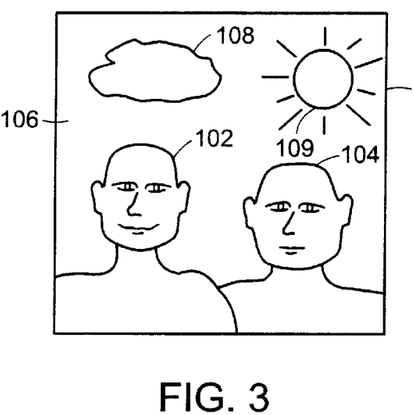
FIG. 3 is an illustration of a video image for processing by an embodiment of the present invention.

FIG. 3 is an illustration of a video image for processing by an embodiment of the present invention. Video image 100 contains images representing human faces, face 102 and face 104. The background 106 of video image 100 contains an image of a cloud 108 and an image of a sun 109. Referring back to FIG. 2, these images are received through camera interface 54 and stored as video images 62 in memory 60 using conventional video imaging technology. Throughput enhancement component 64 processes these images (as described in detail below), with the help of processor 52, to create the mapped images and templates needed for determining the allocation of bandwidth on communications links within communications network 18.

Figure 4:
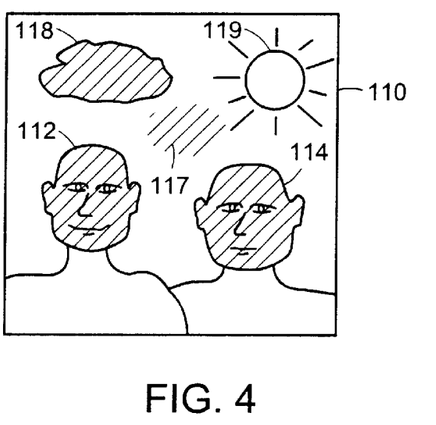
FIG. 4 is an illustration of a video image processed by an embodiment of the present invention, creating a color mapped image.

FIG. 4 is an illustration of a video image processed by an embodiment of the present invention, creating a color mapped image. Color mapped image 110 is one step in the process of creating throughput enhanced video communication. A color mapped image 110 is produced by applying a color matching process to video image 100. In one preferred embodiment the color range used for matching is a range of flesh-tone colors. The goal of color matching is to attempt to reduce the regions of the video image that will be transmitted at higher resolution by identifying non-facial colors in the video image 100. Here, the color mapped image 110 identifies four regions that contain enough of the colors in a flesh-tone range to be identified. Face 112, face 114, cloud 118 and a region of the background 117 have been identified, they will be used in a subsequent process to create a face template. Obviously, not all color mapped regions correspond to human faces. Therefore, an embodiment of the present invention allows a user to interact with the color mapped image 110 to eliminate certain color mapped regions (e.g., cloud 118 and background region 117). Additionally, certain color mapped regions can be added. For example, if face 112 was partially obscured by a shadow, the color matching procedure may not identify the entire face 112. Here, the user can interact with the throughput enhancement component 64 to identify the non-matching portions as belonging to the face 112.

Figure 5:
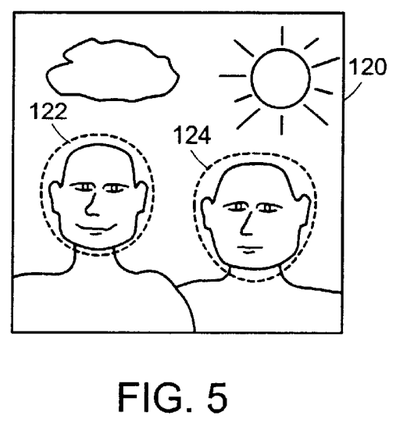
FIG. 5 is an illustration of a video image processed by an embodiment of the present invention, creating a face template image.

FIG. 5 is an illustration of a video image processed by an embodiment of the present invention, creating a face template image. Face template images 122 and 124 are generated by applying a face shape matching procedure to the already produced color mapped image. The face shape matching procedure works by attempting to match identified regions of the color mapped image to vertically-oriented oval shapes, to create face template images 122 and 124. This procedure will eliminate the identified cloud 118 image and background region 117 as not matching a vertically-oriented oval shape. The face template images 122 and 124 represent one level of granularity for use in determining how to allocate bandwidth on the communication links connecting the computers 14 on communications network 18.

Figure 6:
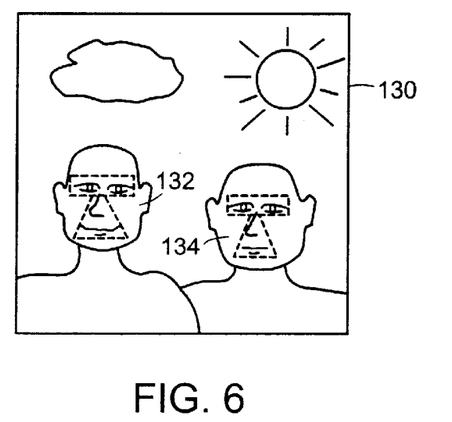
FIG. 6 is an illustration of a video image processed by an embodiment of the present invention, creating an eyes/nose/mouth template image.

FIG. 6 is an illustration of a video image processed by an embodiment of the present invention, creating an eyes/nose/mouth template image. Within the face template images 122 and 124, an eyes/nose/mouth template image can be created by identifying the rectangular portion of the image within the face template images 122 and 124 that encompasses the eyes. In addition, the triangular portion within the face template images 122 and 124 that encompasses the nose and mouth area can be identified. The combination of the rectangular eye portion and the triangular nose/mouth portion create eyes/nose/mouth template images 132 and 134. The eyes/nose/mouth template images 132 and 134 represent the finest level of granularity for use in determining how to allocate bandwidth on the communication links connecting the computers 14 on communications network 18.

Figure 7:
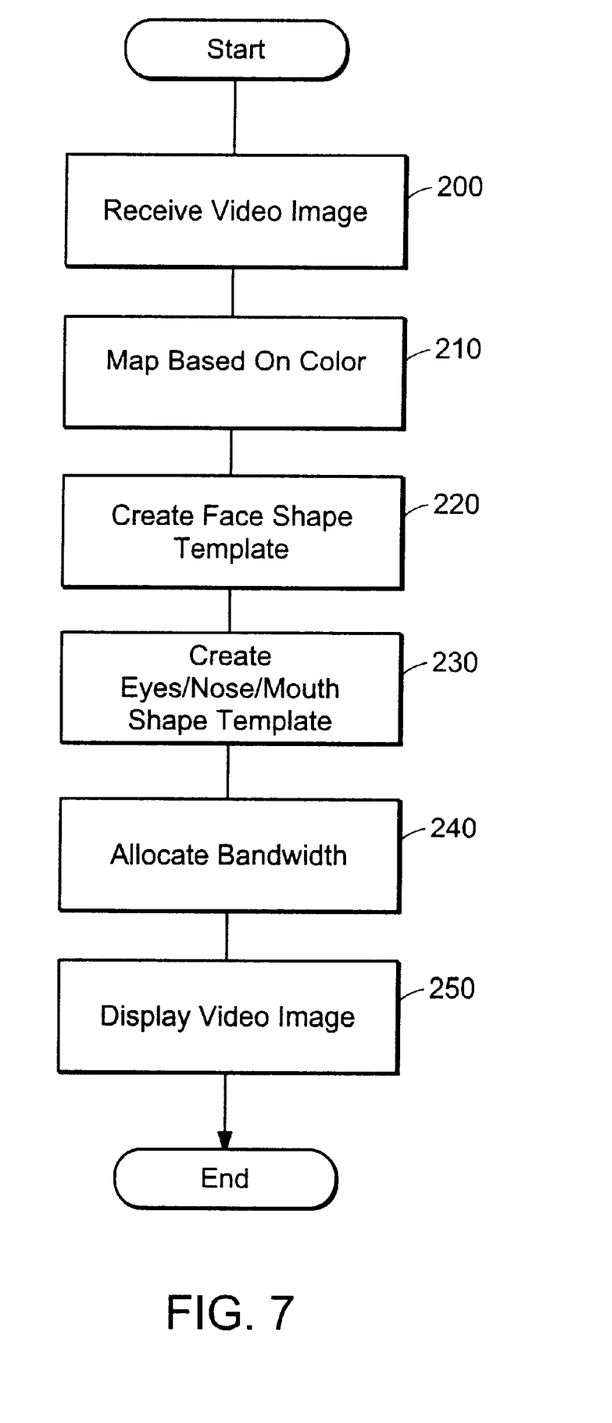
FIG. 7 is a flowchart of a throughput enhanced video communications method as implemented by an embodiment of the present invention.

FIG. 7 is a flowchart of a throughput enhanced video communications process as implemented by an embodiment of the present invention. The process begins at step 200 where a video image is received. The video image is received from a camera 10 connected to a camera interface 54, it is processed by computer 14 and typically transmitted to another computer on communications network 18, as part of a videotelephony system application. It is possible for the video image to be stored locally on computer 14 without being transmitted over communications network 18 and processed by throughput enhancement component 64. An example of this "local processing" can occur when the throughput enhancement component 64 is being tested or debugged, and the resulting mapped images and template images are being compared to expected images for determination of the system's effectiveness.

Once a video image is received (step 200) a color mapped image 110 is created at step 210. A color mapped image 110 is produced by applying a color matching process to the video image received at step 200. In one preferred embodiment the color range used for matching is a range of flesh-tone colors. The goal of color matching is to attempt to reduce the regions of the video image that will be transmitted at higher resolution by identifying non-facial colors in the video image 100. The color range for matching is settable through a user interface to a full range of colors. The "wider" the range of color the user chooses, the greater the number/size of the identified regions in the color mapped image will be. Additionally, the "closeness" of the color range chosen, to the actual color of faces in the video image, will also affect the number/size of the identified regions in the color mapped image.

Step 220 creates a face shape template by applying a face matching procedure to the already produced (step 210) color mapped image. The face matching procedure works by attempting to match identified regions of the color mapped image to vertically-oriented oval shapes, to create a face template image.

Step 230 creates an eyes/nose/mouth shape template by using the previously created (step 220) face template image and identifying the rectangular portion that encompasses the eyes and the triangular portion that encompasses the nose and mouth. The two portions are combined to create an eyes/nose/mouth shape template.

At step 240, bandwidth on the communication links connecting the computers 14 on communications network 18 can be allocated according to a priority scheme determined by the templates resulting from the enhanced throughput processing. Typically, lowest priority will be given to regions outside the boundaries of the face template, a higher priority can be given to regions inside the boundaries of the face template, and the highest priority can be given to regions inside the boundaries of the eyes/nose/mouth template.

Each video image displayed on a display screen 12 is represented by a pixel image. The pixel image is the representation of a color graphic in a computer's memory. Pixel is short for picture (pix) element (el). A pixel is one spot in a rectilinear grid of thousands of such spots that are individually "painted" to form an image produced on the screen by a computer. A pixel is the smallest element that display and software can manipulate in creating images. A pixel map is a data structure that describes the pixel image of a graphic, including such features as color, image, resolution, dimensions, storage format, and number of bits used to describe each pixel. The frequency with which the entire screen is redrawn (i.e., pixel refreshed) to maintain a constant, flicker-free image is referred to as the refresh rate. On TV screens and raster-scan monitors, the electron beam that lights the phosphor coating on the inner surface of the screen typically refreshes the entire image area at a rate of about 60 hertz, or 60 times per second. (Interlaced monitors, which redraw alternate lines during each sweep of the electron beam, actually refresh any particular line only 30 times per second. Because odd and even lines are refreshed on successive sweeps, however, the effective refresh rate is 60 times per second.)

Video images (e.g., video image 21 and 22), that are transmitted over communications network 18, are composed of pixels. If the "most interesting" pixels (e.g., those within the eyes/nose/mouth region) are received from their source at a greater rate than "less interesting" pixels (e.g., those within the background) then the result will be an effectively higher resolution for interesting regions of the screen. The enhanced throughput component 64 allows a videotelephony system to assign priority to different regions of pixels on a screen based upon their relationship to generated templates. These region priorities can be send back to the video image source such that the video image source can organize the transmission of the video images in a way that is optimized for specific (e.g., template defined) regions.

Finally, at step 250, the video image, having been processed by the enhanced throughput component 64 can be displayed on display 12.

The enhanced throughput process can be repeated at regular intervals or executed on demand, to ensure that the video images being viewed are being optimally processed by the source video image provider.

The enhanced throughput component may be used in conjunction with existing video streaming (e.g., RealServer/RealPlayer G2 from RealNetworks, Inc.) and existing MPEG-4 systems to improve the display of video images. Enhanced throughput processing is especially effective in low bandwidth situations (e.g., analog modem connections or cellular modem connections) because it can narrow the number of pixels that require updating in any given period, thereby prioritizing the allocation of the bandwidth on the communications link.

The enhanced throughput component may be used in conjunction with existing locking and tracking systems that attempt to lock onto and track interesting objects within a video image. The mapped image templates and face template images can be used to help identify interesting object within a video image that can be used as a basis for locking and tracking.

While this invention has been particularly shown and described with references to preferred embodiments thereof, it will be understood by those skilled in the art that various changes in form and details may be made therein without departing from the scope of the invention encompassed by the appended claims. It is noted that various aspects of the foregoing description may vary with implementations of the principles of the invention. For example, monitoring of certain subjects within a video image is possible using a preferred embodiment of the present invention. Specifically, objects of interest can be identified and effective video resolution enhanced. This is especially effective in environments where many changes occur in regions of the video image that are not of interest to the user (e.g., highly volatile backgrounds). The enhanced throughput component allows a user to focus on the details of one subject within a video imaging environment.

What is claimed is:

1. A method providing throughput enhanced video communication comprising the steps of:
   receiving a video image over a communications link;
   mapping the video image based on a predetermined range, resulting in a range mapped image;
   creating a first template around certain regions of the range mapped image;
   creating a second template around certain regions within first template; and
   directly allocating bandwidth on the communications link without requiring compression, based on the regions of the video image that are: 1) outside the boundaries of the first template, 2) inside the boundaries of the first template, and 3) inside the boundaries of the second template.

2. The method of claim 1 wherein the predetermined range can be adjusted.

3. The method of claim 1 wherein the predetermined range is a range comprising at least one of a black and white, gray-scale or color spectrum.

4. The method of claim 3 wherein the color range includes a range of flesh-tones.

5. The method of claim 1 wherein the range is non-contiguous.

6. The method of claim 1 wherein the boundaries of the first template can be adjusted.

7. The method of claim 6 wherein the first template is associated with a tracking system such that the first template is adjusted as the video image changes.

8. The method of claim 1 wherein the certain regions define shapes.

9. The method of claim 8 wherein the shapes approximate the shape of a human face.

10. The method of claim 8 wherein the certain regions are non-contiguous.

11. The method of claim 1 wherein the boundaries of the second template can be adjusted.

12. The method of claim 11 wherein the second template is associated with a tracking system such that the second template is adjusted as the video image changes.

13. The method of claim 1 wherein the certain regions within the first template define shapes.

14. The method of claim 13 wherein the shapes approximates a rectangular shape of the eyes region of a human face and a triangular shape of the nose-mouth region of a human face.

15. The method of claim 13 wherein the certain regions within the first template are non-contiguous.

16. The method of claim 1 wherein a highest amount of bandwidth is allocated to the image within the boundaries of the second template, a next highest amount of bandwidth is allocated to the image within the boundaries of the first template, and remaining bandwidth is allocated to the image outside the boundaries of the first template.

17. The method of claim 1 wherein the allocation of bandwidth can be adjusted.

18. The method of claim 1 wherein the communications link can be DSL, analog, cable, wireless or power line.

19. An apparatus providing throughput enhanced video communication comprising:
   a communications interface device connected to a communications link receiving a video image;
   a memory which can store:
      a range mapped image created based on mapping the video image against a predetermined range,
      a first template created around certain regions of the image mapped image;
      a second template created around certain regions within the first template; and
   the communications link having bandwidth directly allocated without requiring compression, based on the regions of the video image that are: 1) outside the boundaries of the first template, 2) inside the boundaries of the first template, and 3) inside the boundaries of the second template.

20. The apparatus of claim 19 wherein the predetermined range can be adjusted.

21. The apparatus of claim 19 wherein the predetermined range is a range comprising at least one of black and white, gray-scale and color spectrum.

22. The apparatus of claim 21 wherein the color range includes a range of flesh-tones.

23. The apparatus of claim 19 wherein the range is non-contiguous.

24. The apparatus of claim 19 wherein the boundaries of the first template can be adjusted.

25. The apparatus of claim 24 wherein the first template is associated with a tracking system such that the first template is adjusted as the video image changes.

26. The apparatus of claim 19 wherein the certain regions define shapes.

27. The apparatus of claim 26 wherein the shapes approximate the shape of a human face.

28. The apparatus of claim 26 wherein the certain regions are non-contiguous.

29. The apparatus of claim 19 wherein the boundaries of the second template can be adjusted.

30. The apparatus of claim 29 wherein the second template is associated with a tracking system such that the second template is adjusted as the video image changes.

31. The apparatus of claim 19 wherein the certain regions within the first template define shapes.

32. The apparatus of claim 31 wherein the shapes approximates a rectangular shape of the eyes region of a human face and a triangular shape of the nose-mouth region of a human face.

33. The apparatus of claim 31 wherein the certain regions within the first template are non-contiguous.

34. The apparatus of claim 19 wherein a highest amount of bandwidth is allocated to the image within the boundaries of the second template, a next highest amount of bandwidth is allocated to the image within the boundaries of the first template, and remaining bandwidth is allocated to the image outside the boundaries of the first template.

35. The apparatus of claim 19 wherein the allocation of bandwidth can be adjusted.

36. The apparatus of claim 19 wherein the communications link can be DSL, analog, cable, wireless or power line.

37. An apparatus providing throughput enhanced video communication comprising:
- a means for receiving a video image over a communications link;
- a means for mapping the video image based on a predetermined range, resulting in a range mapped image;
- a means for creating a first template around certain regions of the range mapped image;
- a means for creating a second template around certain regions within the first template; and
- a means for directly allocating bandwidth on the communications link without requiring compression, based on the regions of the video image that are: 1) outside the boundaries of the first template, 2) inside the boundaries of the first template, and 3) inside the boundaries of the second template.

38. A computer program product comprising:
- a computer usable medium for providing throughput enhanced video communication;
- a set of computer program instructions embodied on the computer usable medium, including instructions to:
  - receive a video image over a communications link;
  - map the video image based on a predetermined range, resulting in a range mapped image;
  - create a first template around certain regions of the range mapped image;
  - create a second template around certain regions within the first template; and
  - directly allocate bandwidth on the communications link without requiring compression, based on the regions of the video image that are: 1) outside the boundaries of the first template, 2) inside the boundaries of the first template, and 3) inside the boundaries of the second template.

39. A propagated signal carried on an electromagnetic waveform, the signal comprising a set of computer program instructions to:
- receive a video image over a communications link;
- map the video image based on a predetermined range, resulting in a range mapped image;
- create a first template around certain regions of the range mapped image;
- create a second template around certain regions within the first template; and
- directly allocate bandwidth on the communications link without requiring compression based on the regions of the video image that are: 1) outside the boundaries of the first template, 2) inside the boundaries of the first template, and 3) inside the boundaries of the second template.

* * * * *

UNITED STATES PATENT AND TRADEMARK OFFICE
CERTIFICATE OF CORRECTION

PATENT NO.      : 6,597,736 B1                                           Page 1 of 1
DATED           : July 22, 2003
INVENTOR(S)     : Charles K. Fadel It is certified that error appears in the above-identified patent and that said Letters Patent is hereby corrected as shown below:

Column 10,
Line 20, delete "image" before "mapped" and insert -- range --.

Signed and Sealed this

Ninth Day of December, 2003

JAMES E. ROGAN
*Director of the United States Patent and Trademark Office*